(12) United States Patent
Hayashi

(10) Patent No.: US 7,715,998 B2
(45) Date of Patent: May 11, 2010

(54) SURVEYING INSTRUMENT

(75) Inventor: Kunihiro Hayashi, Itabashi-ku (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 0 days.

(21) Appl. No.: 12/287,857

(22) Filed: Oct. 14, 2008

(65) Prior Publication Data

US 2009/0119050 A1 May 7, 2009

(30) Foreign Application Priority Data

Nov. 1, 2007 (JP) ............................. 2007-284896

(51) Int. Cl.
*G06F 19/00* (2006.01)
*G06K 9/00* (2006.01)
(52) U.S. Cl. ....................................... 702/94; 382/154
(58) Field of Classification Search .................. 702/94, 702/95, 149, 150, 151; 382/106, 154
See application file for complete search history.

(56) References Cited

U.S. PATENT DOCUMENTS

2003/0007680 A1* 1/2003 Iijima et al. ................. 382/154
2008/0075325 A1* 3/2008 Otani et al. .................. 382/106

FOREIGN PATENT DOCUMENTS

| JP | 06-347271 | 12/1994 |
| JP | 08-043098 | 2/1996 |
| JP | 2004-212058 | 7/2004 |
| JP | 2006-078416 | 3/2006 |
| JP | 2007-170902 | 7/2007 |

* cited by examiner

*Primary Examiner*—Bryan Bui
(74) *Attorney, Agent, or Firm*—Nields, Lemack & Frame, LLC

(57) ABSTRACT

There are provided a horizontal angle detector for detecting a horizontal angle, an elevation angle detector for detecting an elevation angle, a dynamic displacement detector for detecting posture displacement of a surveying instrument main unit in two horizontal directions, and a calculating unit, wherein the dynamic displacement detector detects displacement with respect to standard posture of the surveying instrument main unit 1, the calculating unit calculates the horizontal angle and the elevation angle corresponding to dynamic displacement detected by the dynamic displacement detector, and compensates the horizontal angle and the elevation angle obtained by the horizontal angle detector and the elevation angle detector respectively are compensated based on the calculated horizontal angle and the calculated elevation angle.

5 Claims, 6 Drawing Sheets

SURVEYING INSTRUMENT

BACKGROUND OF THE INVENTION

The present invention relates to a surveying instrument, by which it is possible to perform a measurement with high accuracy and quickly by compensating a deviation of an optical axis of a measuring light when the deviation occurs on the optical axis of the measuring light due to vibration.

A surveying instrument is used to perform a distance measurement and a measurement of a horizontal angle and a vertical angle by directing the optical axis of the measuring light of a distance measuring light optical system toward an object to be measured. A surveying instrument with tracking function has a rotator, and the rotator is rotated to follow the movement of the object to be measured. The optical axis of the measuring light is directed toward the object to be measured, and the measurement can be performed on the object to be measured.

When the surveying instrument is installed, leveling is carried out on the surveying instrument so that a vertical axis of the surveying instrument concurs with a gravitational direction. The leveling operation is carried out by using a tilt sensor provided on the surveying instrument. The surveying operation is performed with the surveying instrument under leveled condition.

In the meantime, even when the surveying instrument is leveled accurately in standard condition, a posture of the surveying instrument may be deviated, although slightly, when the rotator driven or stopped. Also, a slight angular error may occur during the driving due to an inertial force of a driving unit. In case the measurement is performed dynamically, the error may exert influence on a measured value. Or, the deviation may occur in the leveling condition of the surveying instrument due to causes subsequently occurred, such as the vibration from outside or the like. Under the condition where the deviation has occurred in the leveling condition, an error may be included in the measured value, and an accurate measurement may not be carried out.

Therefore, in the past, in case the deviation occurs in the leveling condition of the surveying instrument—for instance, in case the device is tilted, it has been practiced to detect the tilting and to compensate a measurement result based on a result of the detection.

In the past, to detect the tilting of the surveying instrument, the tilting has been detected with high accuracy by using an air bubble tube type tilt sensor or a tilt sensor to detect the tilting of liquid surface, which are provided on the surveying instrument for the purpose of leveling, The tilt sensor can detect the tilting of the surveying instrument with high accuracy, but it requires longer time for detecting. Further, because a tracking operation is carried out or the like, immediately after the rotator is driven and stopped, a signal from the tilt sensor is not stable due to the vibration caused at the time of stopping. Thus, it is not possible to accurately detect the tilting. Accordingly, it is necessary to wait for some time until the vibration ceases to exist and the tilt sensor can be stabilized. Further, the measurement error may occur during operation.

Also, the tilt sensor does not exhibit high responsiveness and does not response accurately to the vibration from outside—for instance, to the vibration caused by the passing of an automobile on a road near the point where the surveying instrument is installed. Therefore, it has been practiced to perform averaged processing in view of time to the detection signal from the tilt sensor. The tilting in average has been determined, and the measured value has been compensated based on the tilting obtained by the averaged processing.

For this reason, variations in the measurement data are increased because of the vibration.

In some type of the surveying instrument, a pulsed distance measuring light is projected at high speed by rotary irradiation via the rotator and the position of the object to be measured is measured. In this type of surveying instrument, the high inertial force occurs due to stopping or driving of a motor and the rotator, and the posture of the surveying instrument is changing at every moment. In this respect, the tilt sensor as described above exhibits low responsiveness, and the change of posture cannot be detected accurately. Thus, compensation cannot be made with high accuracy.

As the surveying instrument to detect the tilting and to compensate the tilting of the instrument by using the tilt sensor is disclosed in JP-A-06-347271, JP-A-08-43098 and JP-A-2006-78416. The surveying instrument to measure the position of the object to be measured by projecting a laser beam for a position measurement by rotary irradiation is disclosed in JP-A-2004-212058 and JP-A-2007-170902.

SUMMARY OF THE INVENTION

It is an object of the present invention to provide a surveying instrument, by which it is possible to detect the change in the posture of the instrument at high speed and to perform the measurement with high accuracy even when installation posture of the surveying instrument is changed due to the causes occurred subsequently after the leveling of the surveying instrument or even during the operation of the driving unit.

To attain the above object, the surveying instrument according to the present invention comprises a horizontal angle detector for detecting horizontal angle, an elevation angle detector for detecting elevation angle, a dynamic displacement detecting means for detecting posture displacement of a surveying instrument main unit in two horizontal directions, and a calculating unit, wherein the dynamic displacement detecting means detects displacement with respect to standard posture of the surveying instrument main unit, the calculating unit calculates horizontal angle and elevation angle corresponding to dynamic displacement detected by the dynamic displacement detecting means, and compensates the horizontal angle and the elevation angle obtained by the horizontal angle detector and the elevation angle detector respectively based on the calculated horizontal angle and the calculated elevation angle.

Also, the surveying instrument according to the present invention, wherein the dynamic displacement detecting means comprises two sets of image pickup units which are provided on the surveying instrument main unit, wherein optical axes of the two sets of image pickup units are arranged to perpendicularly cross each other in a horizontal plane, and wherein the calculating unit acquires two image data before and after the transition of time by each of the image pickup units, obtains dynamic displacement of the surveying instrument main unit by a comparison of the two image data, and calculates the horizontal angle and the elevation angle corresponding to dynamic displacement, and compensates the horizontal angle and the elevation angle obtained by the horizontal angle detector and the elevation angle detector based on the calculated horizontal angle and the calculated elevation angle.

Further, the surveying instrument according to the present invention, wherein a photodetection element for outputting image data, which is provided in the image pickup unit, is an image detecting element having pixels with coordinate positions and having a photodetection area as required. Also, the surveying instrument according to the present invention, wherein said image pickup unit provides the photodetection elements, and wherein said photodetection element for outputting image data is two line sensors perpendicularly crossing each other. Also, the surveying instrument according to the present invention, wherein the two image data used for comparison are data along two lines perpendicularly crossing each other as set up on the photodetection element. Further, the surveying instrument according to the present invention, wherein the dynamic displacement detecting means is an acceleration sensor.

The present invention provides the surveying instrument, which comprises a horizontal angle detector for detecting horizontal angle, an elevation angle detector for detecting elevation angle, a dynamic displacement detecting means for detecting posture displacement of a surveying instrument main unit in two horizontal directions, and a calculating unit, wherein the dynamic displacement detecting means detects displacement with respect to standard posture of the surveying instrument main unit, the calculating unit calculates horizontal angle and elevation angle corresponding to dynamic displacement detected by the dynamic displacement detecting means, and compensates the horizontal angle and the elevation angle obtained by the horizontal angle detector and the elevation angle detector respectively based on the calculated horizontal angle and the calculated elevation angle. As a result, even when dynamic displacement occurs due to the error in the posture caused by the vibration and by the driving of the instrument itself, it is possible to compensate the horizontal angle and the elevation angle to match the displacement and to measure the elevation angle and the horizontal angle with high accuracy by eliminating an influence from the vibration.

DETAILED DESCRIPTION OF THE PREFERRED EMBODIMENT

Referring to the attached drawings, description will be given below on the best aspect of the invention when the present invention is carried out.

Figure 1:
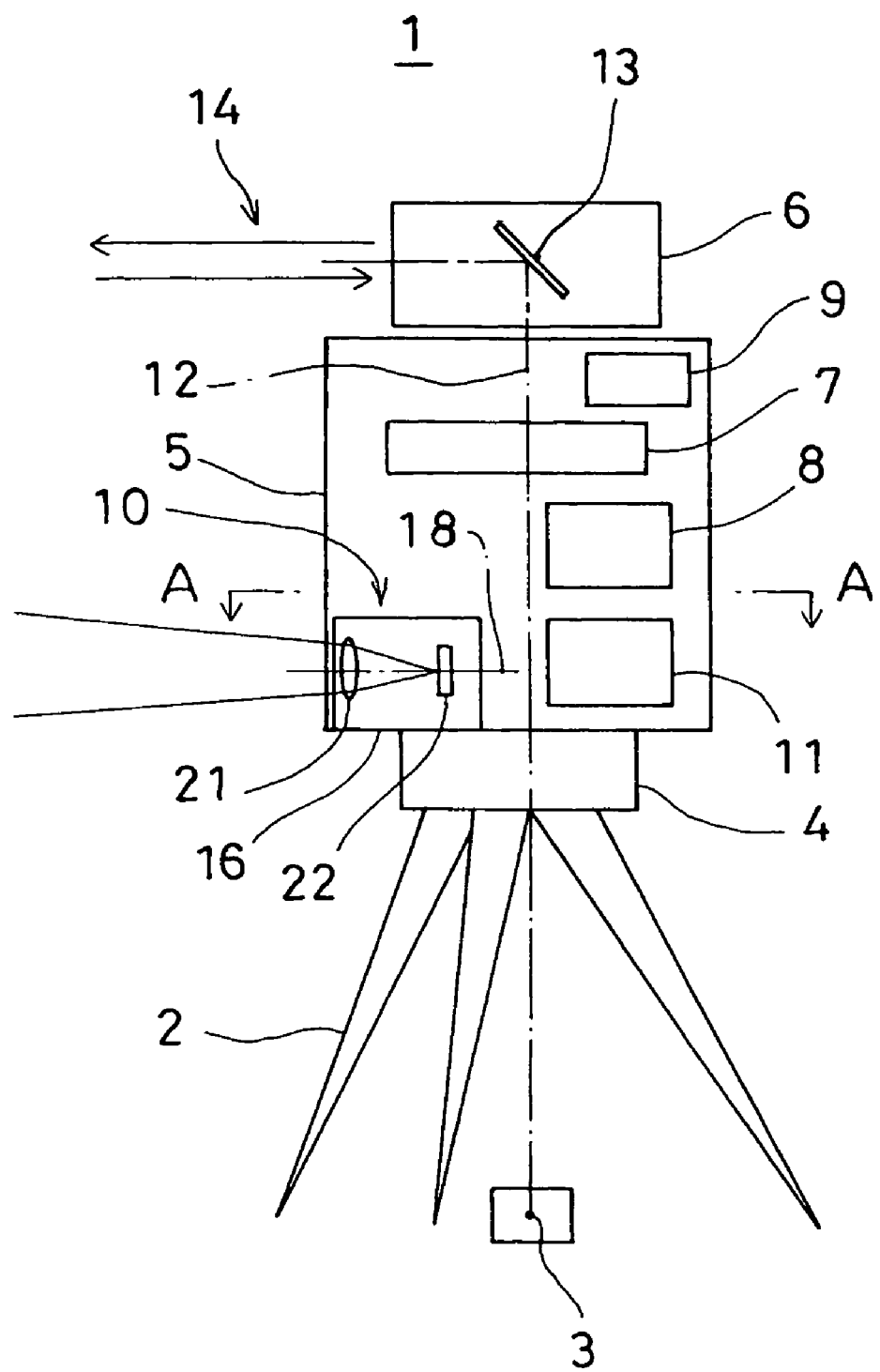
FIG. 1 is a drawing to explain general features of a surveying instrument according to an embodiment of the present invention.
Figure 2:
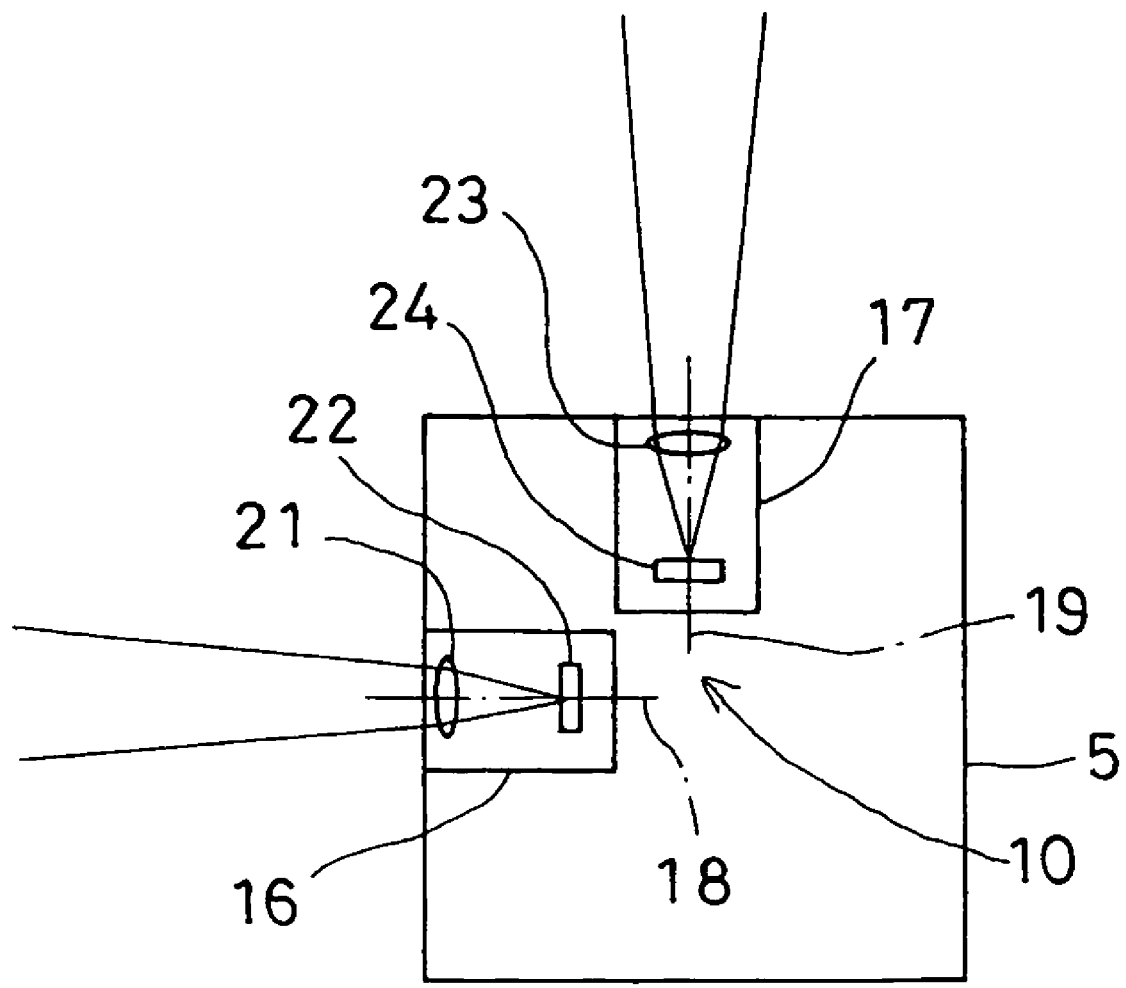
FIG. 2 is an arrow diagram along the line A-A in FIG. 1.

First, referring to FIG. 1 to FIG. 3, description will be given on an example of a surveying instrument, in which the present invention is carried out. The surveying instrument shown in FIG. 1 is a three-dimensional measuring instrument, for instance. A distance measuring light is projected by rotary irradiation, and the distance measuring light reflected from an object to be measured is detected and received, and the elevation angle and the horizontal angle are measured.

The surveying instrument 1 is installed via a tripod 2. The central axis of the surveying instrument 1 concurs with the vertical line, and its posture is set in such manner that the central axis passes through a known point 3.

The surveying instrument 1 primarily comprises a leveling unit 4, a surveying instrument main unit 5 installed on the leveling unit 4, and a rotary projecting unit 6 rotatably mounted on a top of the surveying instrument main unit 5.

The leveling unit 4 supports the surveying instrument main unit 5 at three points, for instance. The surveying instrument main unit 5 can be freely tilted around one supporting point, and positions in height of the other two supporting points can be adjusted by an actuator (motor) respectively. By adjusting the position in height of each of the two supporting points by the actuator, the surveying instrument main unit 5 can be tilted in two directions.

Inside the surveying instrument main unit 5, a tilt sensor 7 for detecting the tilting of the surveying instrument main unit 5 is provided. Based on the result of detection by the tilt sensor 7, the leveling unit 4 performs leveling of the surveying instrument main unit 5 so that the central axis of the surveying instrument main unit 5 concurs with the vertical line.

Inside the surveying instrument main unit 5, there are provided a distance measuring unit 8 comprising a light projecting unit 25 (see FIG. 3) and a photodetection unit 26 (see FIG. 3), a rotary driving unit 9, a posture detecting device 10, a control unit 11, etc.

The light projecting unit 25 comprises a projection light optical system including a light emitting source and a vertical optical axis 12, and a distance measuring light 14 is projected in a direction toward an object to be measured (e.g. a prism) 27. The photodetection unit 26 comprises a photodetection element and a photodetection optical system, and the distance measuring light reflected by the object to be measured 27 is detected and received. The distance measuring unit 8 measures a distance to the object to be measured 27 and the elevation angle based on the reflected distance measuring light detected by the photodetection unit 26.

The rotary driving unit 9 rotates the rotary projecting unit 6 at a constant speed in horizontal direction, which is a part of the projection light optical system. It comprises rotation angle detecting means, e.g. a horizontal angle encoder 28 (see FIG. 3) for detecting the horizontal angle, for instance, and an elevation angle encoder 29 (see FIG. 3). The rotation angle detecting means detects a direction of the distance measuring light projected from the rotary projecting unit 6, and the result of detection is transmitted to the control unit 11. The rotary projecting unit 6 is designed to rotate around the optical axis 12 of the light projecting unit, and it is provided with a deflecting optical member, e.g. a mirror 13. The mirror 13 is arranged on the optical axis 12 and it is rotatably supported around the horizontal axis. The distance measuring light 14 projected along the optical axis 12 is deflected by the mirror 13 in horizontal direction and is projected. When the rotary projecting unit 6 is rotated, the distance measuring light 14 is scanned in horizontal direction. The mirror 13 is rotated, and the distance measuring light 14 is scanned in vertical direction.

The control unit 11 controls the leveling unit 4, the distance measuring unit 8 and the rotary driving unit 9. The control unit 11 also controls a leveling operation of the surveying instrument main unit 5 and projects the distance measuring light by controlling the distance measuring unit 8. By receiving the reflection light from the object to be measured 27, the control unit 11 measures the distance to the object to be measured 27. Then, based on the result of detection by the rotation angle detecting means, the control unit 11 measures the horizontal angle and the elevation angle of the object to be measured 27.

The posture detecting device 10 detects dynamic displacement of the surveying instrument main unit 5 caused by the vibration. The posture detecting device 10 comprises two sets of image pickup units 16 and 17. Each of the two sets of image pickup units 16 and 17 has the same arrangement, and optical axes of these two sets of image pickup units 16 and 17 are directed in horizontal direction and are directed in the directions crossing perpendicularly to each other. For instance, the optical axis 18 of the image pickup unit 16 is directed in the direction of X-axis, and an optical axis 19 of the image pickup unit 17 is directed in the direction of Y-axis.

Now, description will be given on the image pickup unit 16. The image pickup unit 17 has the same configuration as that of the image pickup unit 16, and description is not given here.

The image pickup unit 16 comprises an image forming lens 21 and a photodetection element 22 arranged along the optical axis 18. The image forming lens 21 forms an image of a scene around the surveying instrument 1 on the photodetection element 22. The photodetection element 22 is an image detecting element which has an area and is composed of a multiple of pixels, for instance, CCD. Each pixel has a position identified in a coordinate system having the optical axis 18 as the origin on the photodetection element 22. Similarly to the image pickup unit 16, the image pickup unit 17 has an image forming lens 23 and a photodetection element 24.

The distances from the image forming lens 21 and from the photodetection element 22 to a photodetection plane are already known. Therefore, when the position of a pixel is identified, field angle on the identified pixel can be determined.

It is so designed that a photodetection signal from the photodetection element 22 is transmitted to the control unit 11 together with coordinate signal of each pixel for each pixels.

Figure 3:
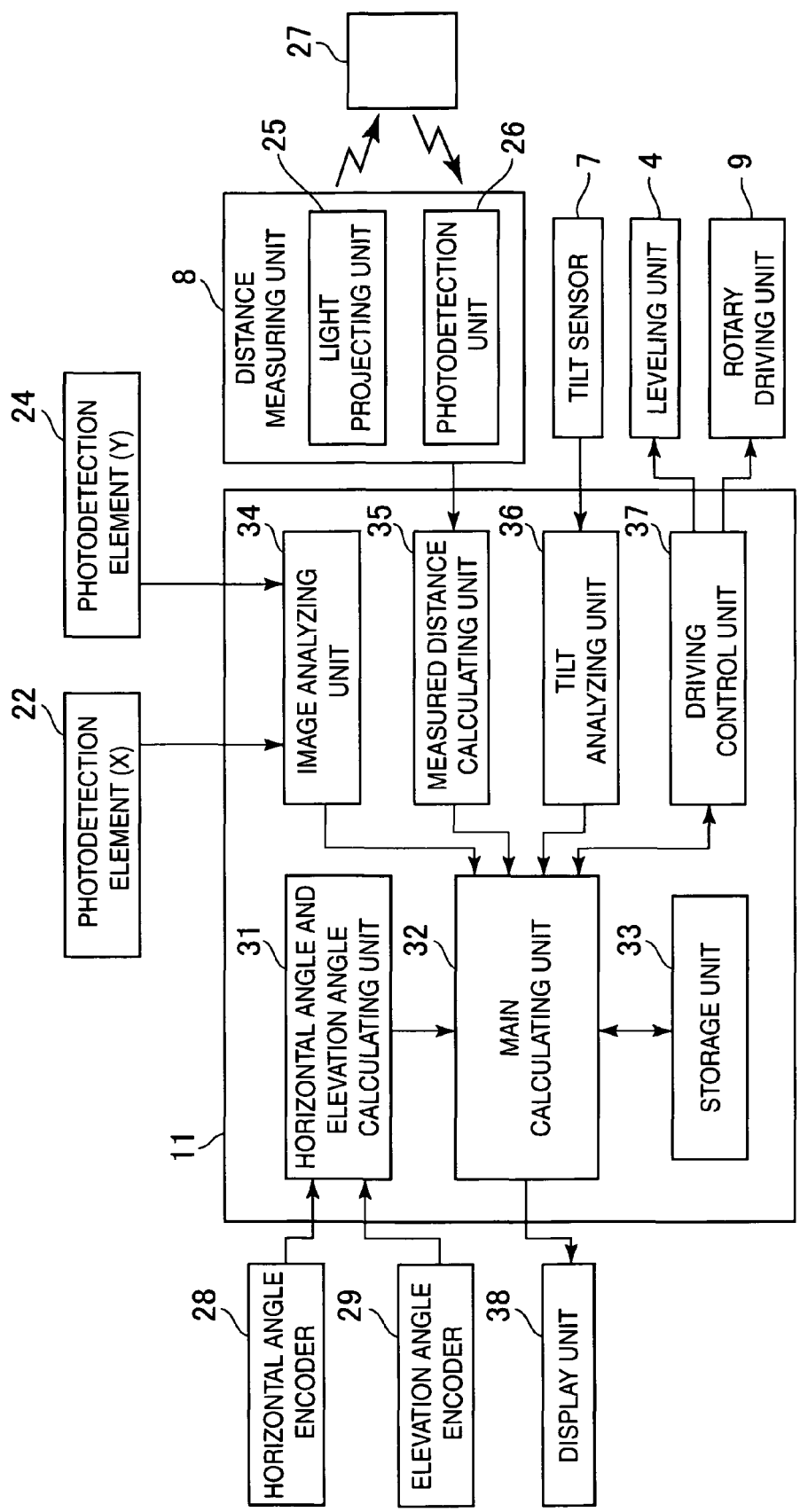
FIG. 3 is a control block diagram of the surveying instrument according the embodiment of the invention.

FIG. 3 represents approximate arrangement of a control system in the surveying instrument according to the present invention.

The control unit 11 primarily comprises a horizontal angle and elevation angle calculating unit 31, a main calculating unit 32, a storage unit 33, an image analyzing unit 34, a measured distance calculating unit 35, a tilt analyzing unit 36, and a driving control unit 37. The measuring conditions, measurement results, etc. are displayed on a display unit 38.

The storage unit 33 is semiconductor memory, HDD, etc. Various types of programs are stored in the storage unit 33. These programs include: a sequence program for instructing the surveying instrument 1 to measure distance, an image processing program for detecting the deviation of horizontal angle and the deviation of elevation angle based on an image signal from the photodetection element 22 and from the photodetection element 24, a compensation calculating program for compensating the measurement results based on the deviation of horizontal angle and the deviation of elevation angle calculated, and other programs. Further, data such as distance measurement data as measured, the detected horizontal angle and elevation angle, the deviation of horizontal angle, the deviation of elevation angle, etc. are stored.

The horizontal angle and the elevation angle detected respectively by the horizontal angle encoder 28 and the elevation angle encoder 29 are inputted to the horizontal angle and elevation angle calculating unit 31. The elevation angle and the horizontal angle are calculated at the horizontal angle and elevation angle calculating unit 31, and the results of calculation are inputted to the main calculating unit 32.

The results obtained by images taken by the image pickup unit 16 and the image pickup unit 17 are transmitted to the image analyzing unit 34 as photodetection signals from the photodetection element 22 and the photodetection element 24 respectively. Blurring of images is detected at the image analyzing unit 34. Based on the blurring of the image, the deviation of horizontal angle (i.e. a deviation in X direction) and the deviation of elevation angle (i.e. a deviation in Y direction) are calculated respectively. The deviation of horizontal angle and the deviation of elevation angle thus calculated are transmitted to the main calculating unit 32.

The results of detection from the tilt sensor 7 are inputted to the main calculating unit 32 via the tilt analyzing unit 36. The main calculating unit 32 performs leveling through driving control of the leveling unit 4 via the driving control unit 37.

Figure 4A:
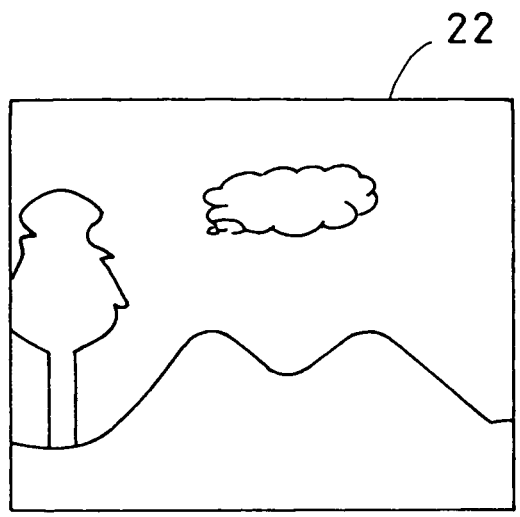
FIG. 4 (A) and FIG. 4 (B) each represents an illustration to explain an image in X direction and in Y direction respectively, each taken by an image pickup unit used in the surveying instrument of the invention.
Figure 4B:
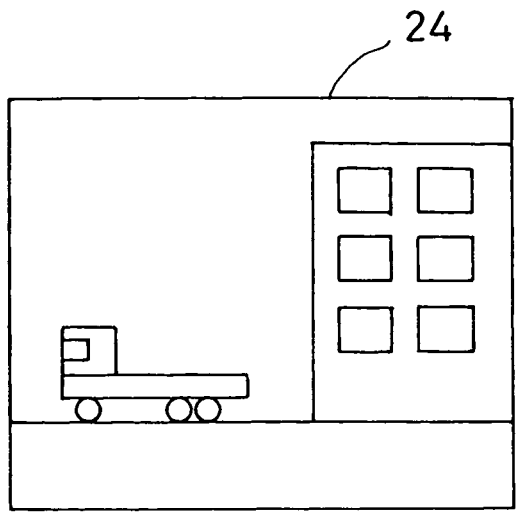
Figure 5A:
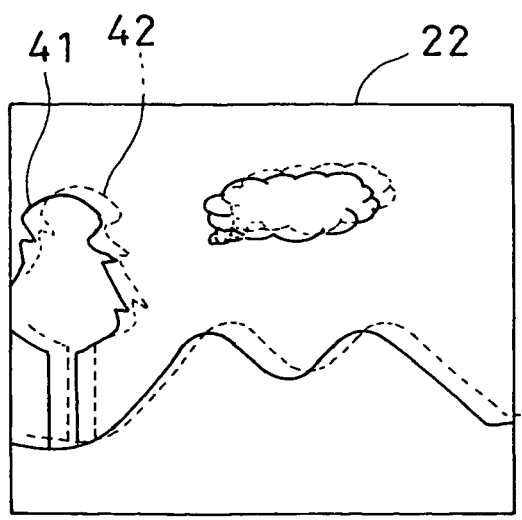
FIG. 5 (A) and FIG. 5 (B) each represents an illustration to explain an image in X direction and in Y direction respectively, each taken by an image pickup unit used in case the vibration occurs in the surveying instrument.
Figure 5B:
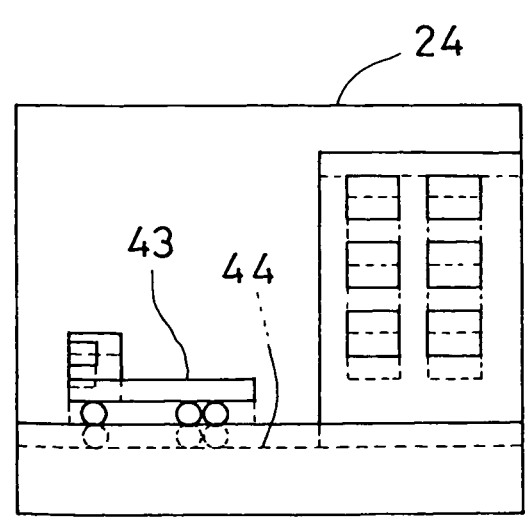

Referring to FIG. 4 and FIG. 5, description will be given below on an operation.

First, the leveling unit 4 is driven via the driving control unit 37, and the leveling operation is carried out.

Tilting of the surveying instrument main unit 5 is detected by the tilt sensor 7, and the result of detection is inputted to the tilt analyzing unit 36. The tilt analyzing unit 36 judges in which direction and how far the surveying instrument is tilted, and the result of judgment on the tilting is inputted to the main calculating unit 32. At the main calculating unit 32, the leveling unit 4 is driven via the driving control unit 37 based on the result of the judgment on tilting, and the leveling unit 4 is controlled so that the horizontal line is detected by the tilt sensor 7.

When the surveying instrument main unit 5 has been leveled and when the optical axis 12 is turned to the vertical direction, scenes in X direction and in Y direction are taken by the image pickup unit 16 and the image pickup unit 17 respectively. The results of image pickup are stored in the storage unit 33 as standard images (FIG. 4 (A) and FIG. 4 (B)).

The rotary projecting unit 6 is driven to project the light by rotary irradiation, the distance measuring unit 8 is driven, and the measurement operation is started. Distance data obtained by distance measurement are stored in the storage unit 33. As the result of rotation of the rotary projecting unit 6, the vibration occurs, and dynamic displacement of the surveying instrument main unit 5 is caused by the vibration.

During the measurement operation, image pickup operations on the scenes by the image pickup unit 16 and the image pickup unit 17 are continued, and image data are stored in the storage unit 33. The image data are acquired in synchronization with the measurement by the distance measuring unit 8, and the distance data are associated with the image data.

When mechanical displacement occurs on the surveying instrument main unit 5 as the results of the vibration, displacement of the surveying instrument main unit 5 appears as blurring of images taken by the image pickup unit 16 and the image pickup unit 17. FIG. 5 (A) shows images taken by the image pickup unit 16 when displacement occurs in horizontal direction. In FIG. 5 (A), the images indicated by solid lines represent X-standard images 41, and images indicated by broken lines show X-displaced images 42 where the vibration has occurred. Image data of the X-standard images 41 and image data of the X-displaced images 42 are transmitted respectively to the image analyzing unit 34. At the image analyzing unit 34, amount of displacement of the surveying instrument main unit 5 in horizontal direction is obtained based on the X-standard images 41 and the X-displaced images 42.

If a deviation of images between the X-standard images 41 and the X-displaced images 42, i.e. the deviation of images on the photodetection element 22, is obtained as number of pixels, the change of field angle can be obtained. From the field angle thus changed, the amount of displacement of the surveying instrument main unit 5 in horizontal direction is obtained. The deviation of images as given above represents instantaneous displacement changing at every moment, i.e. dynamic displacement.

It is assumed here that both the tripod 2 and the surveying instrument main unit 5 have sufficient rigidity, and that twisting displacement around the optical axis 12 and the falling of the optical axis 12 do not occur by the vibration.

FIG. 5 (B) represents images taken by the image pickup unit 17 when displacement occurs in the vertical direction. In FIG. 5 (B), the images indicated by solid lines represent Y-standard images 43, and images indicated by broken lines represent Y-displaced images 44 when the vibration has occurred.

Similarly, displacement in the vertical direction can be obtained on the photodetection element 24 by the Y-standard images 43 and the Y-displaced images 44.

When displacement occurs in two directions, i.e. in horizontal direction and in vertical direction, horizontal displacement component and vertical displacement component are obtained, and by synthesizing these components, the direction of displacement and amount of displacement can be determined.

Figure 6A:
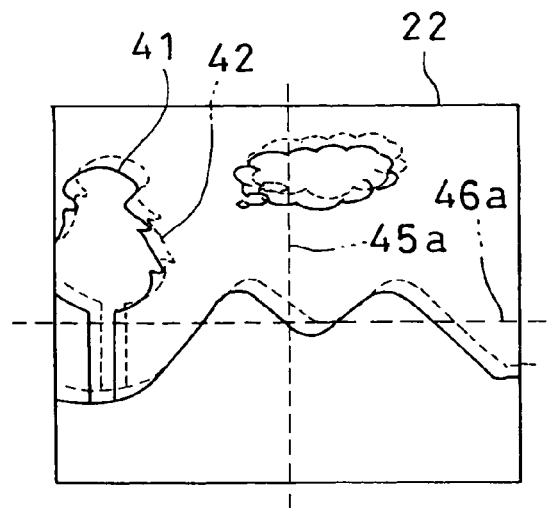
FIG. 6 (A) and FIG. 6 (B) each represents an illustration to explain a case where amount of the deviation is detected based on an image in X direction or in Y direction respectively.
Figure 6B:
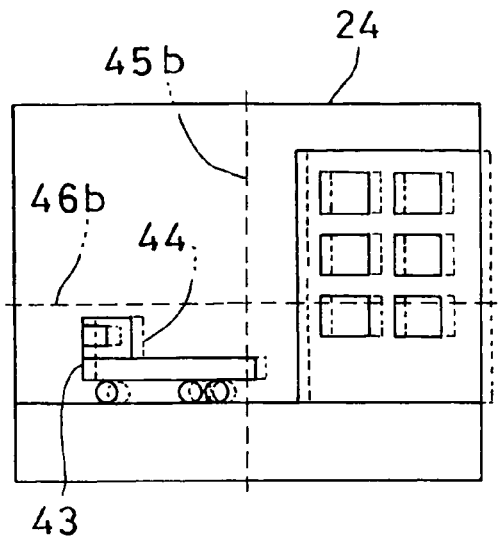
Figure 7A:
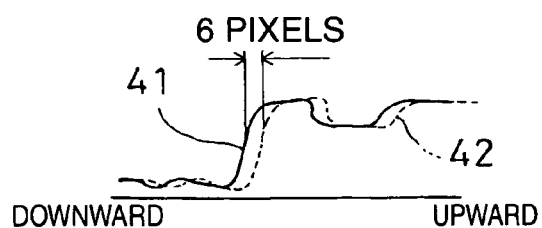
FIG. 7 (A), FIG. 7 (B), FIG. 7 (C) and FIG. 7 (D), each represents illustrations to explain a case where amount of the deviation is detected by image signal on a line specified in the image.
Figure 7C:
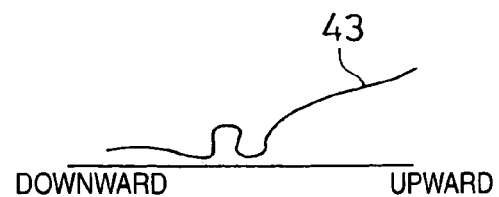
Figure 7B:
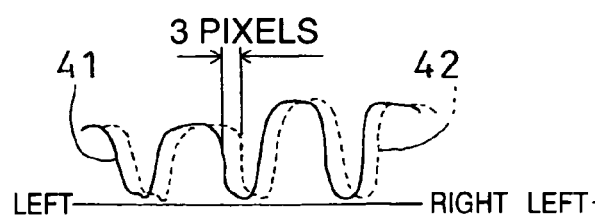
Figure 7D:
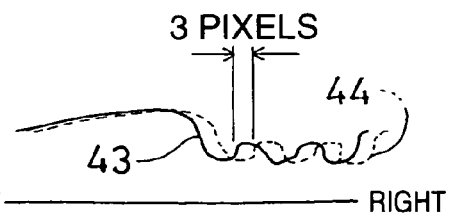

For the purpose of determining the displacement on images, a simple and convenient method as shown in FIG. 6 (A) and FIG. 6 (B) may be used. As the method to obtain displacement in FIG. 6 (A) and FIG. 6 (B), vertical lines 45a and 45b and horizontal lines 46a and 46b are set up on the images, and displacement between the images on the two lines is obtained. To facilitate the comparison of the images, edge processing or the like may be adopted on the images.

In case a method to compare image data by specifying the vertical line 45 and the horizontal line 46 is adopted, line sensors may be used as the photodetection element 22 and the photodetection element 24.

The amount of displacement obtained at the image analyzing unit 34 is transmitted to the main calculating unit 32. The main calculating unit 32 compensates the horizontal angle obtained by the horizontal angle encoder 28 and the elevation angle obtained by the elevation angle encoder 29 based on the amount of displacement determined from the result of distance measurement. By this compensation, the influence of the vibration from the results of the distance measurement can be eliminated, and the measurement accuracy can be improved.

It may be so designed that an image data found one frame before is used as the standard image, and the amount of displacement may be determined based on the blurring of the images between the frames.

The means for detecting the elevation angle is not limited to the elevation angle encoder 29. As described in JP-A-2004-212058, at least three fan beams, with at least one of them tilted at a known tilt angle, are projected at constant speed by rotary irradiation, and based on the time difference between the moments when three fan beams are received at the photodetection element, the elevation angle may be detected.

Referring to FIG. 7, concrete description will be given below on a case where the amount of displacement is obtained based on the images.

FIG. 7 (A) shows an X-standard image 41 and an X-displaced image 42 along the vertical line 45a in FIG. 6 (A). FIG. 7 (B) shows an X-standard image 41 and an X-displaced image 42 along the horizontal line 46a in FIG. 6 (A).

FIG. 7 (C) shows a Y-standard image 43 and a Y-displaced image 44 along the vertical line 45b in FIG. 6 (B). FIG. 7 (D) shows a Y-standard image 43 and a Y-displaced image 44 along the horizontal line 46b in FIG. 6 (B).

On the photodetection element 22, it is apparent that the X-displaced image 42 is deviated in upward direction by 6 pixels according to FIG. 7 (A), and the X-displaced image 42 is deviated in rightward direction by three pixels according to FIG. 7 (B).

Also, it is evident that, on the photodetection element 24, there is no deviation in top-to-bottom direction according to FIG. 7 (C), and that it is deviated by three pixels in rightward direction according to FIG. 7 (D).

In this case, focuses are adjusted to infinity on the image pickup unit 16 and the image pickup unit 17. Accordingly, the deviation of the image represents tilting of the elevation angle in the image optical system respectively, and left-to-right direction represents the deviation of each of the images in horizontal rotating direction. Therefore, amount of the deviation of images on the photodetection element 22 and amount of the deviation of images on the photodetection element 24 basically agree with each other. By finding the number of pixels to correspond to the amount of the deviation, the value can be converted to the angle to match the field angle.

For example, it is supposed here that field angle of the opposite angle of the photodetection element 22, the photodetection element 24 are 1° respectively, and when it is in size of 640 pixels×480 pixels, field angle of one pixel is obtained as:

$$1/(\sqrt{(640 \times 640 + 480 \times 480)}) = 0.001250° = 4.5''$$

Thus, it is found that it is tilted by:
4.5"×3=13.5" in horizontal direction;
4.5"×6=27" in X-axis elevation angle; and
0° in Y-axis direction.

As described above, it can be detected how the surveying instrument main unit 5 is tilted for each frame or for each measurement data. By using this tilting, the elevation angle and the horizontal angle can be compensated.

In case the processing is performed—not on the line, which is set up by image processing, but on the images for one frame or for a required range of one frame, processing speed is decreased, but the amount of information is increased. This results in the increase of resolving power and contributes to the improvement of accuracy.

It may be so arranged that image processing by line and image processing by area are simultaneously used, and a processing method may be selected to match the measuring conditions.

If the amount of the deviation is detected based on the pixel signal only on the line as set up on the photodetection element 22 and the photodetection element 24, the amount of the data to be processed is decreased, and this contributes to the calculation at higher speed.

As described above, if line sensors are used as the photodetection element 22 and the photodetection element 24, the processing can be performed at higher speed and the cost can be reduced.

In the embodiment as described above, the displacement caused by the vibration is obtained based on the images acquired in two directions. However, as the means to obtain displacement, it may be so designed that an acceleration sensor is used and displacement can be determined by integrating the results of detection.

Figure 8:
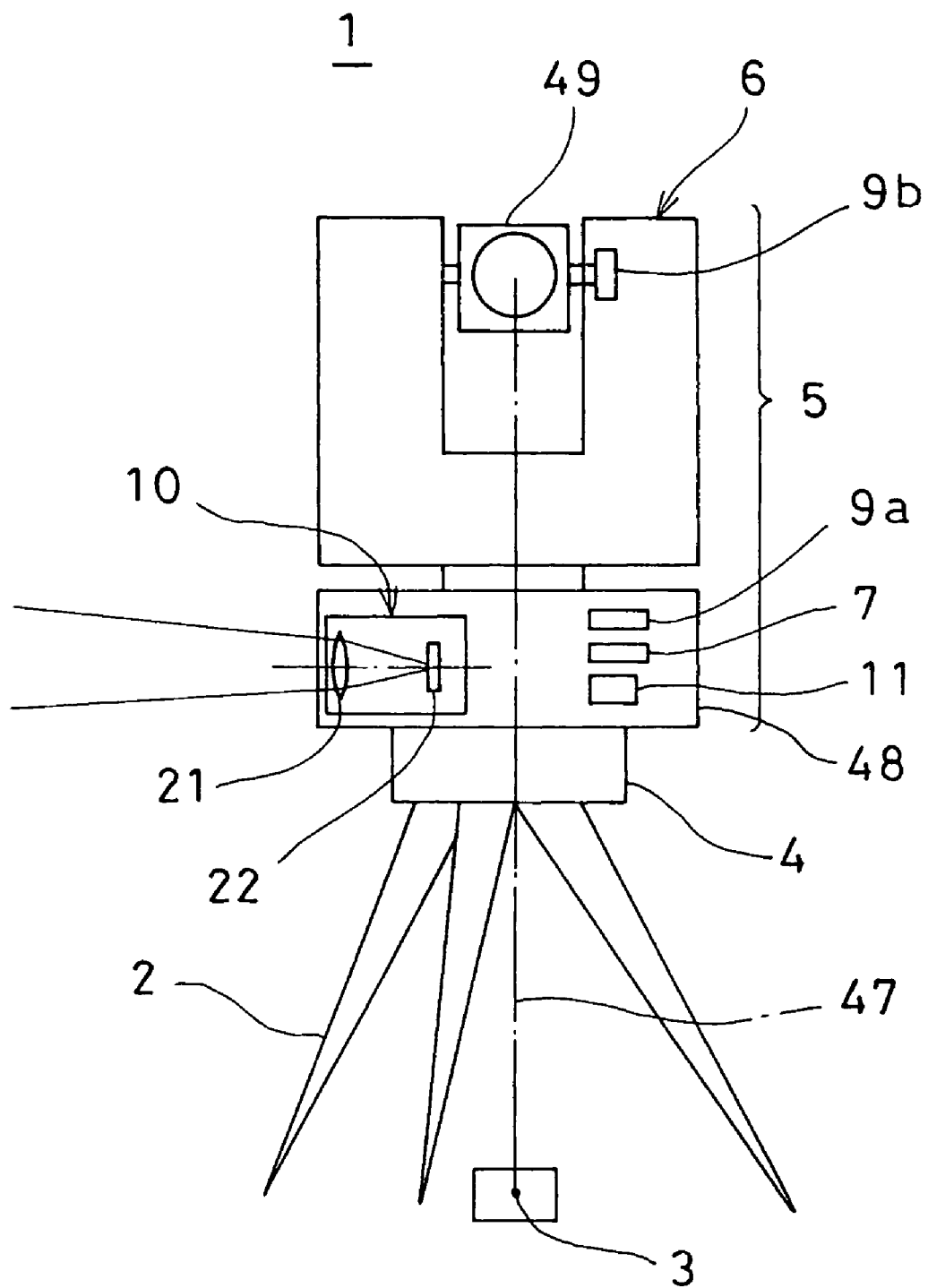
FIG. 8 is a drawing to explain general features of another type of surveying instrument, in which the present invention is carried out.

FIG. 8 shows a case where the present invention is carried out on a total station. In FIG. 8, the same component as shown in FIG. 1 is referred by the same symbol.

The main unit 5 comprises a leveling unit 4, a base unit 48, and a rotary projecting unit 6. A tilt sensor 7, a control unit 11, a posture detecting device 10, etc. are accommodated in the base unit 48. The rotary projecting unit 6 is rotatably mounted around a vertical axis 47 on the base unit 48, and the rotary projecting unit 6 is rotated in horizontal direction by a horizontal rotary driving unit 9a.

The rotary projecting unit 6 has a lens barrel unit 49, which is rotatable around horizontal axis, stores a distance measuring unit (not shown), which comprises the distance measuring light optical system, a distance measuring light emitting unit, a photodetection unit, etc. The lens barrel unit 49 is designed to be rotated in vertical direction by a vertical rotary driving unit 9b. The lens barrel unit 49 is directed toward the object to be measured by the horizontal rotary driving unit 9a and the vertical rotary driving unit 9b.

In this embodiment, images in two directions, i.e. in X-axis direction and Y-axis direction are acquired by the posture detecting device 10, a dynamic displacement of the image is determined, the elevation angle and the horizontal angle are compensated by the displacement obtained, and the result of the distance measurement is compensated. As a result, the measurement can be performed with high accuracy.

The surveying instrument, to which the present invention is applied, may be the three-dimensional measuring device as described above, or a total station, or a surveying instrument with the tracking function, or a scanner to determine three-dimensional configuration of an object by driving a mirror at high speed. In brief, the present invention can be applied for compensation of the horizontal angle and the elevation angle in a surveying instrument, which has source of the vibration.

What is claimed is:

1. A surveying instrument, comprising a horizontal angle detector for detecting horizontal angle, an elevation angle detector for detecting elevation angle, a dynamic displacement detecting means for detecting posture displacement of a surveying instrument main unit in two horizontal directions, and a calculating unit, wherein said dynamic displacement detecting means detects displacement with respect to standard posture of the surveying instrument main unit, said calculating unit calculates horizontal angle and elevation angle corresponding to dynamic displacement detected by said dynamic displacement detecting means, and the horizontal angle and the elevation angle obtained by said horizontal angle detector and said elevation angle detector respectively based on the calculated horizontal angle and the calculated elevation angle, and wherein said dynamic displacement detecting means comprises two sets of image pickup units which are provided on said surveying instrument main unit, wherein optical axes of said two sets of image pickup units are arranged to perpendicularly cross each other in a horizontal plane, and wherein said calculating unit acquires two image data before and after the transition of time by each of the image pickup units, obtains dynamic displacement of the surveying instrument main unit by a comparison of said two image data, and calculates the horizontal angle and the elevation angle corresponding to dynamic displacement, and compensates the horizontal angle and the elevation angle obtained by said horizontal angle detector and said elevation angle detector based on the calculated horizontal angle and the calculated elevation angle.

2. A surveying instrument according to claim 1, wherein a photodetection element for outputting image data, which is provided in said image pickup units, is an image detecting element having pixels at coordinate positions and having a photodetection area as required.

3. A surveying instrument according to claim 1 or claim 2, wherein said image pickup unit provides the photodetection elements, and wherein said photodetection element for outputting image data is two line sensors perpendicularly crossing each other.

4. A surveying instrument according to claim 1 or claim 3, wherein said two image data used for comparison are data along two lines perpendicularly crossing each other as set up on the photodetection element.

5. A surveying instrument according to claim 1, wherein said dynamic displacement detecting means is an acceleration sensor.

* * * * *